G. WAHL & B. WEIMANN.
Glass Dish.
No. 221,635.  Patented Nov. 11, 1879.
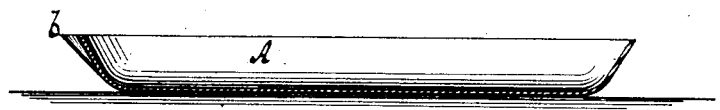
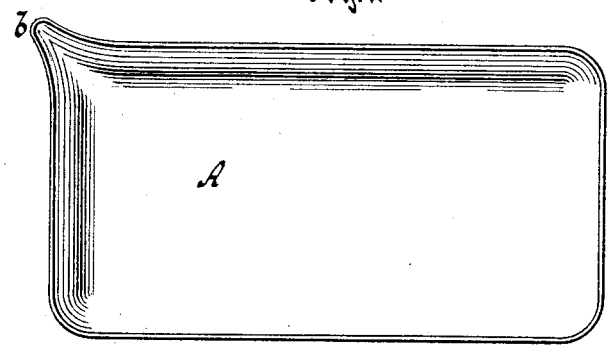

UNITED STATES PATENT OFFICE.

GEORGE WAHL AND BALTHASAR WEIMANN, OF NEW YORK, N. Y.

IMPROVEMENT IN GLASS DISHES.

Specification forming part of Letters Patent No. 221,635, dated November 11, 1879; application filed September 18, 1879.

*To all whom it may concern:*

Be it known that we, GEORGE WAHL and BALTHASAR WEIMANN, both of the city, county, and State of New York, have invented a new and useful Improvement in Glass Dishes, which improvement is fully set forth in the following specification, reference being had to the accompanying drawings, in which—

Figure 1 represents a vertical longitudinal section of our dish. Fig. 2 is a plan or top view thereof.

Similar letters indicate corresponding parts.

This invention consists in a dish or pan made of blown glass, as a new article of manufacture.

In carrying out our invention we cut from a sphere or bulb of glass blown in the usual way a sheet or blank having the outline of the dish which it is desired to produce. We then soften this blank by heat, and place the same upon a former, and bend it down upon this former to the desired shape. The glass blank is heated to such a degree that when it is placed upon the former it is sufficiently soft to adapt itself thereto; but, if desired, an instrument, as a wiper, may be used to press the edges of the blank down upon the sides of the former. In this manner we obtain a dish or pan of blown glass of uniform thickness throughout, with a flat bottom, and one which requires no further labor after it has been formed.

In the drawings, the letter A designates a dish made according to our invention. This dish has a spout, b, and is of the form commonly used by photographers to hold acids; but it is obvious that our invention is applicable to a variety of dishes.

What we claim as new, and desire to secure by Letters Patent, is—

A dish or pan made of blown glass, substantially as described, as a new article of manufacture.

In testimony that we claim the foregoing we have hereunto set our hands and seals this 13th day of September, 1879.

GEORGE WAHL. [L. S.]
BALTHASAR WEIMANN. [L. S.]

Witnesses:
  W. HAUFF,
  CHAS. WAHLERS.